(12) United States Patent
Molthan et al.

(10) Patent No.: US 12,497,038 B2
(45) Date of Patent: Dec. 16, 2025

(54) ASSISTANCE SYSTEM FOR A ROAD VEHICLE

(71) Applicant: Siemens Mobility GmbH, Munich (DE)

(72) Inventors: Helge Molthan, Bad Feilnbach (DE); Claus Seisenberger, Neufrannhofen (DE)

(73) Assignee: Siemens Mobility GmbH, Munich (DE)

( * ) Notice: Subject to any disclaimer, the term of this patent is extended or adjusted under 35 U.S.C. 154(b) by 338 days.

(21) Appl. No.: 18/006,412

(22) PCT Filed: Jul. 6, 2021

(86) PCT No.: PCT/EP2021/068654
§ 371 (c)(1),
(2) Date: Jan. 23, 2023

(87) PCT Pub. No.: WO2022/017783
PCT Pub. Date: Jan. 27, 2022

(65) Prior Publication Data
US 2023/0294688 A1  Sep. 21, 2023

(30) Foreign Application Priority Data

Jul. 22, 2020 (DE) ...................... 10 2020 209 258.3

(51) Int. Cl.
*G08G 1/042* (2006.01)
*B60W 30/12* (2020.01)
(Continued)

(52) U.S. Cl.
CPC ........... *B60W 30/12* (2013.01); *G05D 1/0261* (2013.01); *G08G 1/167* (2013.01)

(58) Field of Classification Search
CPC ..... B60W 30/12; G05D 1/0261; G08G 1/167; G08G 1/042
See application file for complete search history.

(56) References Cited

U.S. PATENT DOCUMENTS

| 9,238,411 B2 | 1/2016 | Dronnik et al. |
| 2014/0097054 A1* | 4/2014 | Francke ................... B60L 5/19 |
| | | 191/59.1 |

(Continued)

FOREIGN PATENT DOCUMENTS

| CN | 107972666 A | * | 5/2018 | .............. B60L 53/60 |
| DE | 19961449 A1 | * | 9/2001 | ................ B61L 3/20 |

(Continued)

*Primary Examiner* — Daniel M. Robert
(74) *Attorney, Agent, or Firm* — Laurence A. Greenberg; Werner H. Stemer; Ralph E. Locher

(57) ABSTRACT

An assistance system for a road vehicle which can be used on a roadway having one or more lanes, includes a position determination system for determining a lateral relative position of the road vehicle on the roadway. The position determination system has an electrical signal line disposed parallel to the roadway, a signal generator for generating and feeding an electrical signal into the signal line, resulting in a current flow which can be generated in the signal line, an on-vehicle sensor assembly for capturing a field strength and/or a field direction of an electromagnetic field forming about the signal line as a result of the current flow generated, and an on-vehicle evaluation unit, configured to determine, from the captured field strength and/or field direction, a lateral relative position of the road vehicle relative to the signal line. A more reliable position determination system is thus provided.

8 Claims, 2 Drawing Sheets

(51) Int. Cl.
*G05D 1/00* (2024.01)
*G08G 1/16* (2006.01)

(56) References Cited

U.S. PATENT DOCUMENTS

| | | | | |
|---|---|---|---|---|
| 2014/0138200 A1* | 5/2014 | Dronnik | ............... | B60L 5/36 |
| | | | | 191/59.1 |
| 2016/0082957 A1* | 3/2016 | Zsombory | ............ | G08G 1/167 |
| | | | | 701/1 |
| 2017/0371350 A1* | 12/2017 | Engdahl | ............ | G01C 21/005 |
| 2018/0356833 A1* | 12/2018 | Öhman | ............ | G05D 1/0265 |
| 2021/0300381 A1* | 9/2021 | Hong | ............ | E01F 9/30 |

FOREIGN PATENT DOCUMENTS

| | | | | |
|---|---|---|---|---|
| DE | 10256705 A1 * | 7/2004 | ............ | B60L 5/36 |
| DE | 10316413 A1 | 10/2004 | | |
| DE | 102006061425 A1 | 6/2006 | | |
| DE | 102011076615 A1 | 11/2012 | | |
| EP | 0504047 A1 * | 9/1992 | | |
| JP | H0855297 A | 2/1996 | | |
| JP | 2012174032 A * | 9/2012 | | |

\* cited by examiner

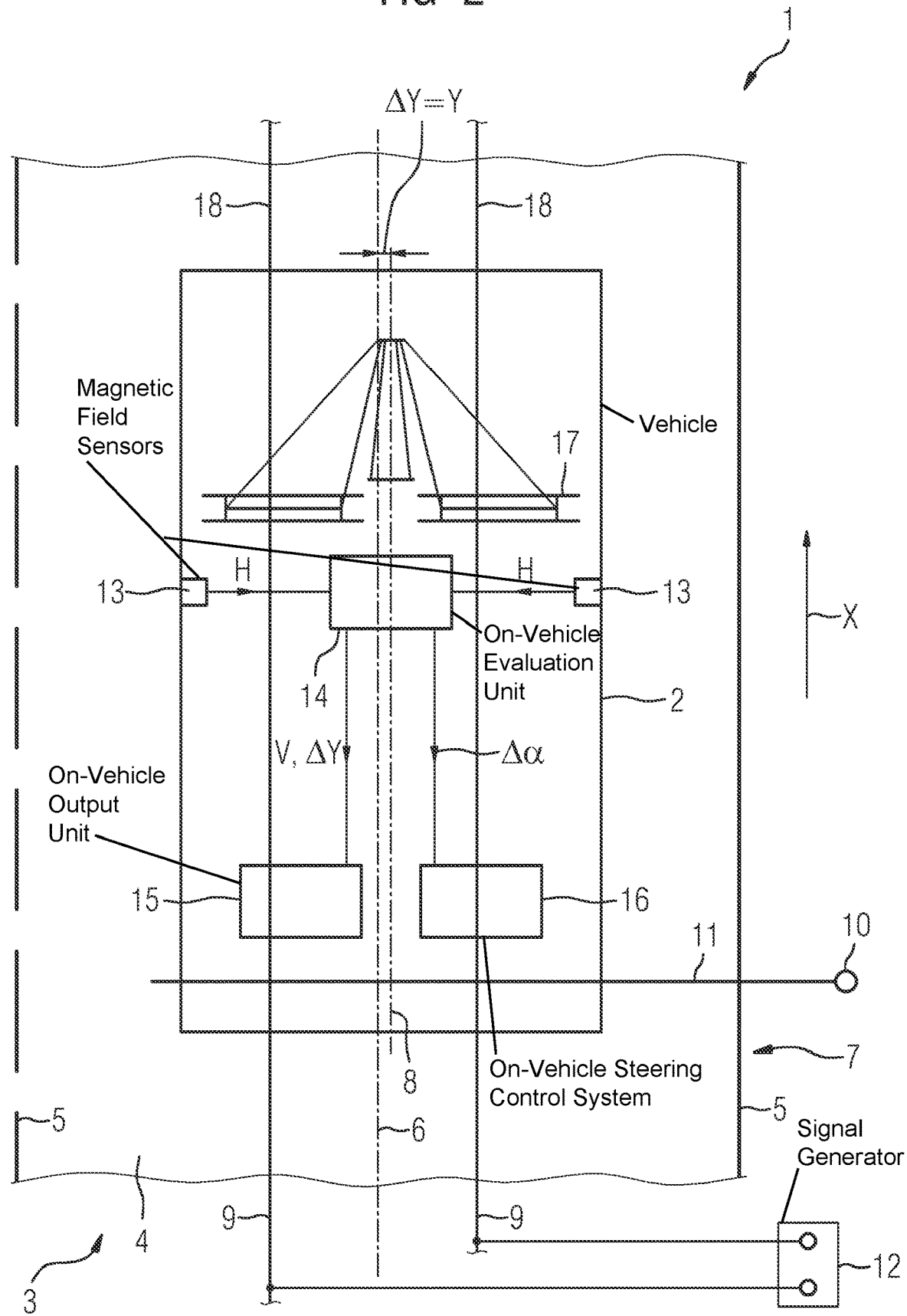

ASSISTANCE SYSTEM FOR A ROAD VEHICLE

FIELD AND BACKGROUND OF THE INVENTION

The invention relates to an assistance system for a road vehicle which can be used on a roadway having one or more lanes, comprising a position determination system for determining a lateral position of the road vehicle on the roadway.

The determination of the lateral position of a road vehicle, in particular of a passenger vehicle or truck, is of central importance for many assistance systems. For both lane-keeping systems and for steering control systems of partially automated or autonomous road vehicles, it is crucial to know on which lane of a multiple-lane roadway or where within a lane the road vehicle is currently located.

Known position determination systems have on-vehicle facilities, in particular video cameras or other optical scanning facilities, for optically detecting orientation lines of the course of a lane. Thus, a method and an apparatus for lane guidance of a vehicle is known from published patent application DE 103 16 413 A1, in which lateral lane boundary markings are detected as orientation lines and evaluated for correcting the direction of movement of the vehicle. In contrast, published patent application DE 10 2006 061 425 A1 teaches an orientation to ruts forming within a lane. However, camera-based position determination systems are unreliable or fail completely, when roadway markings are worn, ruts are not present or both orientation lines are undetectable due to difficult weather conditions such as heavy rain or fog, snow-covered roadways or difficult lighting conditions such as glare when driving at night or when the sun is low in the sky.

SUMMARY OF THE INVENTION

The object of the invention is therefore to provide an assistance system of the aforementioned type, the position determination system of which is more reliable.

The object is achieved by an assistance system of this type. Accordingly, the position determination system of the assistance system has an electrical signal line arranged along the roadway. The signal line can be of single-pole or multi-pole design and be suspended laterally or above the roadway, for example, on masts with transverse support facilities. Furthermore, it has a signal generator for generating and feeding an electrical signal into the signal line, as a result of which a current flow can be generated in the signal line. The signal is preferably a low-frequency signal, the frequency of which is in the range from 1 kHz to 10 MHz. In addition, it has an on-vehicle sensor assembly for capturing a field strength and/or a field direction of an electromagnetic field forming around the signal line on the basis of the current flow generated. The sensor assembly can, for example, have one or more sensors for detecting the magnetic field component. Moreover, the position determination system has an on-vehicle evaluation unit which is designed to determine a lateral position of the road vehicle relative to signal line from the captured field strength and/or field direction. Around a conductor through which current flows, a cylindrically symmetrical alternating magnetic field is formed over its entire length, the field strength of which decreases with increasing distance from the conductor and the field direction of which depends on the current direction through the conductor according to the so-called left-hand rule. In the case of signal lines with two or more poles, their magnetic fields are superimposed as a function of the distance of the conductor poles and of the current direction through the conductor poles. From this, the relative position of the magnetic field sensor with respect to the signal line can be determined on the basis of the field strength and field direction measured at the location of the magnetic field sensor or at the locations of the magnetic field sensors. From the known mounting positions of the magnetic field sensor or the magnetic field sensors on the road vehicle, its lateral position relative to the signal line can be determined. This position determination is regardless of weather conditions, lighting conditions and snow cover and is therefore more reliable than camera-based position determinations.

In an advantageous embodiment of the assistance system according to the invention, the signal line is arranged above the roadway along a lane center of a lane or at defined lateral distances to the lane center. The lane center of a lane is to be understood here to mean a surface which is perpendicular to the roadway surface, and which contains a line extending centrally between a left and a right lane boundary line. The lane center is, for example, flat in the case of a lane extending in a straight line and cylindrical in the case of a lane extending in a circular arc. If the signal line is single-pole and runs in the lane center or if it is two-pole and its conductor poles run symmetrically to the lane center, the lane center becomes the orientation line, relative to which the lateral position of the road vehicle is determined. If the signal line runs at defined lateral distances from the lane center, possibly varying as a function of the longitudinal position, the lateral distances assigned to the respective longitudinal positions can be stored in a database which is accessed by the evaluation unit when determining the lateral relative position of the road vehicle.

In a further advantageous embodiment of the assistance system according to the invention, the signal line is designed with two poles and the signal generator is designed to generate and feed a differential electrical signal into the two conductor poles of the signal line. In the case of two-pole signal lines, it is advantageous to feed a differential signal into the conductor poles as the electromagnetic field which forms with it is particularly well suited for precise position determination. In principle, however, the position determination system can also be used in single-pole signal lines, in which case the position determination system is then fed to ground.

In a further advantageous embodiment of the assistance system according to the invention, the sensor assembly has a plurality of magnetic field sensors arranged laterally offset on a vehicle roof of the road vehicle. For position determination, it is advantageous if the vehicle is operated with a plurality of locally offset magnetic field sensors which are arranged, for example, to the right and left of the vehicle roof.

In a further advantageous embodiment of the assistance system according to the invention, the evaluation unit is designed to determine a lane currently used by the road vehicle from a plurality of lanes of the roadway from the determined relative position. From the number and width of lanes known for a direction of travel of the roadway, it is possible, by means of the determined relative position, to infer the lane currently being traveled on by the road vehicle. Knowledge of the lanes currently being used by a road vehicle is in turn a prerequisite for a multiplicity of lane-selective applications of the assistance system.

In a further advantageous embodiment of the assistance system according to the invention, the evaluation unit is designed to determine a current lateral offset of the road vehicle from the lane center of the lane used from the determined relative position. Knowledge of the current lateral offset of a road vehicle from the lane center of the lane used can be used, for example, for assistance systems for lane guidance, tracking and autonomous operation of a road vehicle.

In a further advantageous embodiment, the assistance system according to the invention comprises an on-vehicle output unit for visual and/or acoustic output of the lane used and/or the lateral offset from a lane center of the lane used to a driver of the road vehicle. The lane used can be displayed for the driver, for example, on a screen of a vehicle device, for instance a navigation device. For example, a warning tone can be emitted for the driver if the lateral offset of the lane center exceeds a preset threshold.

In a further advantageous embodiment of the assistance system according to the invention, the signal generator is designed to modulate data representing longitudinal position and lane-specific traffic information onto the electrical signal, the output unit being designed to output longitudinal position and lane-specific traffic information to a driver of the road vehicle as a function of the current longitudinal position and the currently used lane of the road vehicle. The electrical signal may comprise a carrier signal on which data is modulated using known methods of communication technology. The modulated data represents traffic information which is specific to a current longitudinal position of the road vehicle—for instance, a speed restriction, a toll for use of the road, a navigation instruction or even the presence of contact wires for an energy supply via an on-vehicle current collector—or which is specific to a currently used lane of the road vehicle—for instance, an imminent lapse or a construction or accident-related obstruction of the lane.

In a further advantageous embodiment, the assistance system according to the invention comprises an on-vehicle steering control system for the automated guidance of the road vehicle within the used lane to which the currently determined lateral offset of the road vehicle from the lane center can be fed to determine a change in the steering angle. In order to keep the road vehicle within a desired value for the lateral offset from the lane center, the current offset is continuously determined and fed to the steering control system as an actual value. The steering control system can determine a required change in steering angle from this in order to guide and keep the road vehicle in the lane.

In a further advantageous embodiment of the assistance system according to the invention, the signal line is formed by contact wires of a two-pole overhead contact line system designed as outgoing and return conductors, for supplying energy to the road vehicle, it being possible for the contact wires to be contacted by an on-vehicle current collector for the purpose of supplying energy. The assistance system according to the invention is therefore particularly suitable for road vehicles with a current collector which can be brought into sliding contact with the contact wires of an overhead contact line system designed as a signal line for supplying energy. Optionally automated lane guidance of such road vehicles in the electrified lane is particularly advantageous from the point of view of maintaining continuous contact with the contact wires of the overhead contact line system with regard to a continuous energy supply of the electric or hybrid electric vehicle drive. The lateral position determination required for this is then possible without an additional infrastructure installation extending beyond the overhead contact line system.

Further properties and advantages of the invention will emerge from the description which follows of two specific exemplary embodiments with reference to the drawings, which, are illustrated schematically.

BRIEF DESCRIPTION OF THE FIGURES

FIG. 2 shows a second exemplary embodiment of the assistance system according to the invention in plan view with a two-pole signal line.

DETAILED DESCRIPTION OF THE INVENTION

Figure 1:
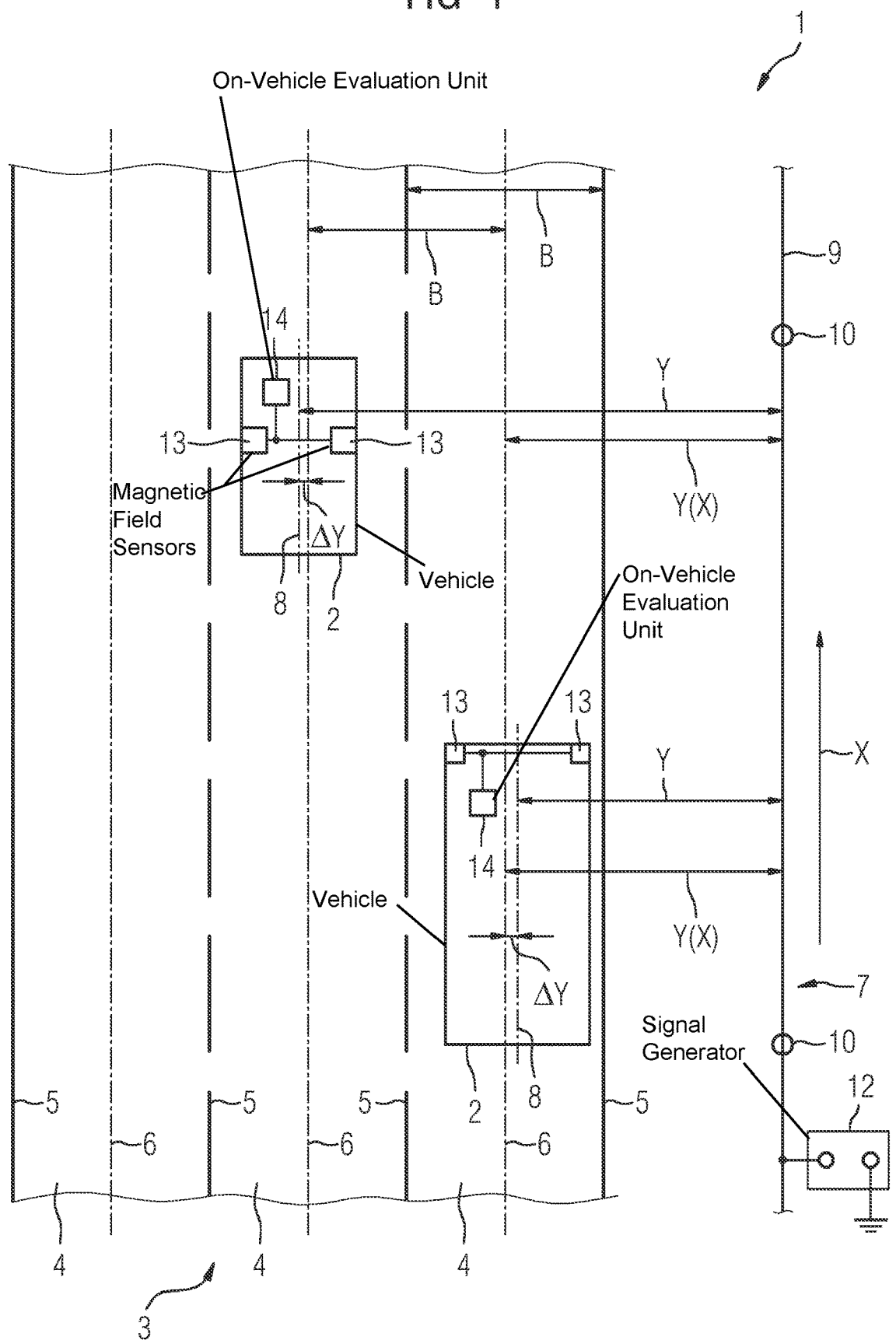
FIG. 1 shows a first exemplary embodiment of the assistance system according to the invention in plan view with a single-pole signal line.

According to FIG. 1 and FIG. 2, an assistance system 1 according to the invention serves to support partially automated or autonomous operation of road vehicles 2 which are operated on a single-lane or multi-lane roadway 3—in the illustrated exemplary embodiments on a three-lane highway with a left, a central and a left lane 4 for the illustrated direction of travel. The lanes 4 each have lateral lane boundary lines 5, a lane center 6 running centrally between them, and a lane width B which corresponds to the distance between the lane centers of adjacent lanes 3. The assistance system 1 comprises a position determination system 7 for determining a lateral position Y of a road vehicle 2 on the roadway 3. On the road vehicle 2, a longitudinal center of the vehicle 8, for example, serves as a reference point for its lateral position Y. The position determination system 7 has, arranged longitudinally with respect to the roadway 3 according to FIG. 1, a single-pole signal line 9 or, according to FIG. 2, a two-pole signal line 9, which are arranged above the level of the roadway 2 via masts 10. According to FIG. 1, they can extend laterally of the roadway 3 or according to FIG. 2, via transverse support facilities 11 fastened to masts 10, over the roadway 3 along a lane center 6. FIG. 1 shows, by way of example, the single-pole case in which the signal line 9 is arranged at defined lateral distances Y (X) from the lane center 6, possibly varying with the longitudinal position X on the roadway 2. In the two-pole case according to FIG. 2, the positive and negative conductor poles of the signal line 9 are arranged symmetrically with respect to the lane center 6. An electrical signal in the form of a low-frequency signal between 1 kHz and 100 MHz, generated by means of a signal generator 12 of the position determination system 7, is fed into the signal line 9, as a result of which an electromagnetic field H, caused by the current flow, is formed around the signal conductor or signal conductors 9. In the case of the two-pole signal line according to FIG. 2, a differential electrical signal can advantageously be fed into the conductor poles. An on-vehicle sensor assembly comprising one or more magnetic field sensors 13, which are arranged spatially distributed, for example, on both sides of the longitudinal center of the vehicle 8 on a vehicle roof of the road vehicle 2, is designed to detect a field strength and/or a field direction of the electromagnetic field.

The position determination system 7 also has an on-vehicle evaluation unit 14, which is designed to determine a lateral position Y of the road vehicle 2 relative to the signal line 9 from the captured field strength and/or field direction of the electromagnetic field H. On the basis of the known lateral distances Y(X) and lane width B stored in the evaluation unit 14, a lane 4 currently used by the road vehicle 2 can be determined from the determined lateral position Y of the road vehicle 2 at a longitudinal position X of the roadway 3. Moreover, the evaluation unit 14 is designed to determine a current lateral offset ΔY of the road vehicle 2 from the lane center 8 of the used lane 4 from the determined relative position Y.

According to FIG. 2, the assistance system 1 comprises an on-vehicle output unit 15 for visual and/or acoustic output of the used lane 4 and/or the lateral offset ΔY of a lane center 6 of the used lane 4 to a driver of the road vehicle 2. It is also designed to output longitudinal position and lane-specific traffic information V to a driver of the road vehicle 2 as a function of the current longitudinal position X and the currently used lane 4 of the road vehicle 2. For this purpose, the signal generator 12 is designed to modulate data representing the electrical signal of longitudinal position and lane-specific traffic information V, closures or disruption on the used lane 4 somewhat ahead, or current speed restrictions.

Furthermore, the assistance system 1 according to FIG. 2 comprises an on-vehicle steering control system 16 for the automated guidance of the road vehicle 2 within the used lane 4. The currently determined lateral offset ΔY of the road vehicle 2 from the lane center 6 is supplied to the steering control system 16 to determine a change in steering angle Δα.

The road vehicle 2 of the exemplary embodiment shown in FIG. 2 has a current collector 17, which makes contact with the contact wires 18 of a two-pole overhead contact line system in order to supply electrical energy. For supplying energy to electrical consumers, in particular the drive, of the road vehicle 2 during travel, the current collector 17 is brought into electrical sliding contact with the contact wires 18. The signal lines 9 of the assistance system 1 according to the invention are in this case formed by the contact wires 18 of the overhead contact line system, which are designed as outgoing and return conductors.

The invention claimed is:

1. An assistance system for a road vehicle to be used on a roadway having one or more lanes, the assistance system comprising:
    a position determination system for determining a lateral position of the road vehicle on the roadway;
    said position determination system including:
        an electrical signal line disposed parallel to the roadway, said
        electrical signal line disposed above the roadway:
            along a lane center of a lane, or
            at defined lateral distances from the lane center,
        a signal generator for generating and feeding an electrical signal into the signal line, for generating a current flow in the signal line,
        an on-vehicle sensor assembly for capturing at least one of a field strength or a field direction of an electromagnetic field forming about the signal line, as a result of the generated current flow, and
        an on-vehicle evaluation unit configured:
            to determine a lateral relative position of the road vehicle relative to the signal line, from at least one of the captured field strength or the field direction, and
            to determine, from the determined lateral relative position, the defined lateral distances and a defined lane width of the one or more lanes of the roadway, a lane currently used by the road vehicle and a current lateral offset of the road vehicle from the lane centre of the used lane.

2. The assistance system according to claim 1, wherein said electrical signal line has two conductor poles, and said signal generator is configured for generating and feeding a differential electrical signal into said two conductor poles of said electrical signal line.

3. The assistance system according to claim 1, wherein said sensor assembly has a plurality of magnetic field sensors disposed laterally offset on a vehicle roof of the road vehicle.

4. The assistance system according to claim 1, wherein said evaluation unit is configured to determine, from the determined lateral relative position, a current lateral offset of the road vehicle from a lane center of a lane being used.

5. The assistance system according to claim 1, which further comprises an on-vehicle output unit for at least one of a visual or acoustic output of a lane being used or a lateral offset from a lane center of the lane being used, to a driver of the road vehicle.

6. The assistance system according to claim 1, wherein:
    said signal generator is configured to modulate data representing electrical signal longitudinal position-specific and lane-specific traffic information; and
    said output unit is configured to output the longitudinal position-specific and lane-specific traffic information to a driver of the road vehicle as a function of a current longitudinal position and a currently used lane of the road vehicle.

7. The assistance system according to claim 1, which further comprises an on-vehicle steering control system for automated guidance of the road vehicle within a lane being used, to which a currently determined lateral offset of the road vehicle can be fed from the lane center for determining a change in a steering angle.

8. The assistance system according to claim 1, wherein said signal line is formed by contact wires of a two-pole overhead contact line system configured as an outgoing and return conductor for supplying energy to the road vehicle, and said contact wires for supplying energy can be contacted by an on-vehicle current collector.

* * * * *